US012664769B2

(12) United States Patent
Fujimoto et al.

(10) Patent No.: US 12,664,769 B2
(45) Date of Patent: Jun. 23, 2026

(54) DEVICE, METHOD AND NON-TRANSITORY RECORDING MEDIUM FOR BUILDING A HIDDEN SEMI-MARKOV MODEL TO ESTIMATE HUMAN ACTION SEGMENTS USING HYBRID LEARNING

(71) Applicant: Fujitsu Limited, Kawasaki (JP)

(72) Inventors: Junya Fujimoto, Atsugi (JP); Osafumi Nakayama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 369 days.

(21) Appl. No.: 18/341,548

(22) Filed: Jun. 26, 2023

(65) Prior Publication Data

US 2023/0343080 A1 Oct. 26, 2023

Related U.S. Application Data

(63) Continuation of application No. PCT/JP2021/002815, filed on Jan. 27, 2021.

(51) Int. Cl.
*G06V 10/778* (2022.01)
*G06V 10/84* (2022.01)
*G06V 40/20* (2022.01)

(52) U.S. Cl.
CPC .......... *G06V 10/7788* (2022.01); *G06V 10/85* (2022.01); *G06V 40/23* (2022.01)

(58) Field of Classification Search
None
See application file for complete search history.

(56) References Cited

U.S. PATENT DOCUMENTS

| | | | |
|---|---|---|---|
| 8,489,117 B2 * | 7/2013 | Shen | G01S 5/017 |
| | | | 342/146 |
| 9,389,302 B2 * | 7/2016 | Liu | G01S 5/0278 |

(Continued)

FOREIGN PATENT DOCUMENTS

| | | |
|---|---|---|
| JP | 2019-005512 A | 1/2019 |
| JP | 2020-021421 A | 2/2020 |
| WO | WO 2020/050111 A1 | 3/2020 |

OTHER PUBLICATIONS

Nakamura, Tomoaki, et al. "Segmenting continuous motions with hidden semi-markov models and gaussian processes." Frontiers in neurorobotics 11 (2017): 67. (Year: 2017).*

(Continued)

*Primary Examiner* — Tahmina N Ansari

(74) *Attorney, Agent, or Firm* — ArentFox Schiff LLP

(57) ABSTRACT

A hidden semi-Markov model includes plural second hidden Markov models each containing plural first hidden Markov models using types of movement of a person as states. The plural second hidden Markov models each use partial actions that are parts of actions determined by combining plural movements as states. In the hidden semi-Markov model observation probabilities are leant for each type of the movements of the plural first hidden Markov models using unsupervised learning. The learnt observation probabilities are fixed, and input first supervised data is augmented to give second supervised data, and transition probabilities of the movements of the first hidden Markov models are learned by supervised learning in which the second supervised data is employed. The learnt observation probabilities and transition probabilities are employed to build the hidden semi-Markov model that is a model for estimating segments of the partial actions.

18 Claims, 19 Drawing Sheets

(56) References Cited

U.S. PATENT DOCUMENTS

| | | | | |
|---|---|---|---|---|
| 10,507,121 | B1 * | 12/2019 | Hoffmann | A61F 2/72 |
| 2006/0122834 | A1 * | 6/2006 | Bennett | G10L 15/1822 |
| | | | | 704/E15.047 |
| 2012/0322460 | A1 * | 12/2012 | Liu | G01S 5/017 |
| | | | | 455/456.1 |
| 2016/0124072 | A1 * | 5/2016 | Liu | G01C 21/20 |
| | | | | 455/456.5 |
| 2020/0372410 | A1 * | 11/2020 | Karaletsos | G06N 20/00 |
| 2023/0067841 | A1 * | 3/2023 | Saharia | G06N 3/047 |
| 2023/0343080 | A1 * | 10/2023 | Fujimoto | G06V 40/23 |

OTHER PUBLICATIONS

Lei, Jun, et al. "Continuous action segmentation and recognition using hybrid convolutional neural network-hidden Markov model model." IET Computer vision 10.6 (2016): 537-544. (Year: 2016).*

European Office Action of European Patent Application No. 21922804.6, dated Jul. 9, 2025.

Extended European Search Report of European Patent Application No. 21922804.6 dated Dec. 21, 2023.

Nakamura, Tomoaki, et al., "Segmenting Continuous Motions with Hidden Semi-markov Models and Gaussian Processes", Frontiers in Neurorobotics, vol. 11, No. 67, Dec. 21, 2017 (Dec. 21, 2017), XP093110358, CH ISSN: 1662-5218, DOI: 10.3389/fnbot.2017.00067.

Natarajan, Pradeep, et al., "Hierarchical multi-channel hidden semi Markov graphical models for activity recognition", Computer Vision and Image Understanding, vol. 117, No. 10, Nov. 25, 2012 (Nov. 25, 2012), pp. 1329-1344, XP093110299, US ISSN: 1077-3142, DOI: 10.1016/j.cviu.2012.08.011.

Doki, Kae, et al., "Modeling method of human action with HSMM considering its temporal and spatial differences", IECON 2013—39th Annual Conference of the IEEE Industrial Electronics Society, IEEE, Nov. 10, 2013 (Nov. 10, 2013), pp. 4210-4215, XP032538950, ISSN: 1553-572X, DOI: 10.1109/IECON.2013.6699811.

"Real-time Audio to Score Alignment Using a Hybrid Hidden Semi-Markov Model and Linear Dynamical System" by Ryuichi Yamamoto, Shinji Sako, and Tadashi Kitamura, Proceedings of the International Society for Music Information Retrieval (MUS) 2012.

"Hidden Semi-Markov Models" by Shun-Zheng Yu in Artificial Intelligence, vol. 174, Issue 2, Feb. 2010, pp. 215 to 243.

"Efficient Parameter Estimation for Hierarchical Hidden Markov Models" by Kei Wakabayashi and Takao Miura in transactions of Institute of Electronics, Information and Communication Engineers 2011.

Suginohara, Kazuya et al. "Indoor Human Behavior Estimation by combining Hierarchical Hidden Markov Model and Laser Sensing System" 2015.

International Search Report issued in International Application No. PCT/JP2021/002815 on Apr. 13, 2021.

"Fujitsu Develops New "Actlyzer" AI Technology for Video-Based Behavioral Analysis", (online), Nov. 25, 2019m Fujitsu Limited (accessed Jan. 19, 2021), Internet (https://pr.fujitsu.com/jp/news/2019/11/25.html).

* cited by examiner

FIG.15

DEVICE, METHOD AND NON-TRANSITORY RECORDING MEDIUM FOR BUILDING A HIDDEN SEMI-MARKOV MODEL TO ESTIMATE HUMAN ACTION SEGMENTS USING HYBRID LEARNING

CROSS-REFERENCE TO RELATED APPLICATION

This application is a continuation application of International Application No. PCT/JP2021/002815, filed on Jan. 27, 2021, the disclosure of which is incorporated herein by reference in its entirety.

FIELD

The present disclosure relates to a partial action segment estimation model building device, a partial action segment estimation model building method, and a partial action segment estimation model building program.

BACKGROUND

Recognition of postures from a video of a person imaged with a normal RGB camera has become possible due to progresses in deep learning technology, and various research and development is being performed into estimating actions of a person utilizing such recognition information. Under such circumstances, effort is being put into estimating time segments where a specified action occurred from time series data of postures observed in people videos.

RELATED ART DOCUMENTS

Non-Patent Documents

Non-Patent Document 1: "Real-time Music Audio Signal to Score Alignment Using a Hybrid Hidden Semi-Markov Model and Linear Dynamical System" by Ryuichi YAMAMOTO, Shinji SAKO, and Tadashi KITAMURA, Proceedings of the International Society for Music Information Retrieval (MUS) 2012.

Non-Patent Document 2: "Hidden Semi-Markov Models" by Shun-Zheng Yu in Artificial Intelligence, Volume 174, Issue 2, February 2010, pages 215 to 243.

Non-Patent Document 3: "Efficient Parameter Estimation for Hierarchical Hidden Markov Models" by Kei WAKA-BAYASHI and Takao MIURA in transactions of Institute of Electronics, Information and Communication Engineers 2011.

SUMMARY

In one exemplary embodiment, a hidden semi-Markov model includes plural second hidden Markov models each containing plural first hidden Markov models using types of movement of a person as states. The plural second hidden Markov models each use partial actions that are parts of actions determined by combining plural movements as states. In the hidden semi-Markov model observation probabilities are leant for each type of the movements of the plural first hidden Markov models using unsupervised learning. The learnt observation probabilities are fixed, and input first supervised data is augmented to give second supervised data, and transition probabilities of the movements of the first hidden Markov models are learned by supervised learning in which the second supervised data is employed. The learnt observation probabilities and transition probabilities are employed to build the hidden semi-Markov model that is a model for estimating segments of the partial actions.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 15 is a schematic diagram illustrating an example of an overview of the present exemplary embodiment.

DESCRIPTION OF EMBODIMENTS

Figure 1:
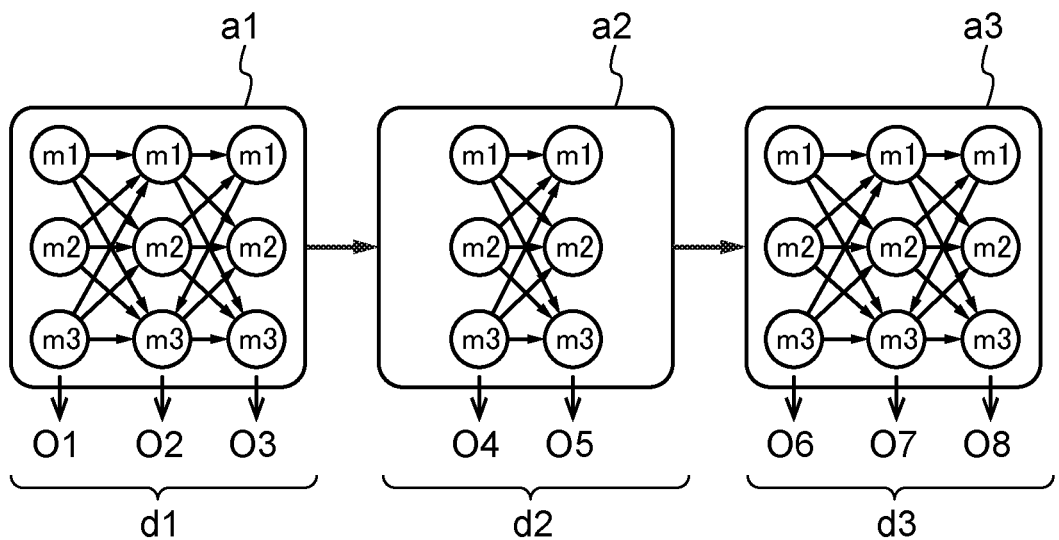
FIG. 1 is a schematic diagram illustrating an example of a hidden semi-Markov model of the present exemplary embodiment.

In the present exemplary embodiment, a hidden semi-Markov model (hereafter referred to as HSMM) such as that illustrated in FIG. 1 is built as an example of a partial action segment estimation model for estimating time segments in which an action of a person occurs. An HSMM has, in addition to the parameters of a hidden Markov model (hereafter referred to as HMM), a probability distribution of successive durations as parameters for each state.

The HSMM of the present exemplary embodiment includes plural first HMMs employing each movement of a person as states, and a second HMM employing action phases corresponding to partial actions as states. m1, m2, m3 are examples of movements, and a1, a2, a3 are examples of action phases. A movement is a combination of plural postures. An action is a combination of plural movements, and is also a combination of plural action phases. An action phase is a combination of movements, and a number of movements included in an action phase is fewer than a number of movements contained in an action. An action phase may, for example, be generated by dividing an action a prescribed number of times, as described later. The number of divisions of an action can be determined experimentally.

When time series sensor data generated by detecting postures of a person is given to an HSMM built by setting parameters, the HSMM estimates optimal action phase time segments (hereafter referred to as action segments). d1, d2, d3 are examples of action phase segments.

Observation probabilities and transition probabilities are present in the parameters of an HMM. O1, . . . , O8 are examples of observation probabilities, and transition probabilities are the probabilities corresponding to arrows linking states. The observation probabilities are probabilities that a given feature is observed in each state, and the transition probabilities are the probabilities of transitioning from a given state to another state. Transition probabilities are not needed for cases in which an order of transition is determined. Note that the number of movements and the number of action phases, namely the number of the first HMIs and the number of second HMMs, are merely examples thereof, and are not limited to the numbers of the example illustrated in FIG. 1.

Figure 2:
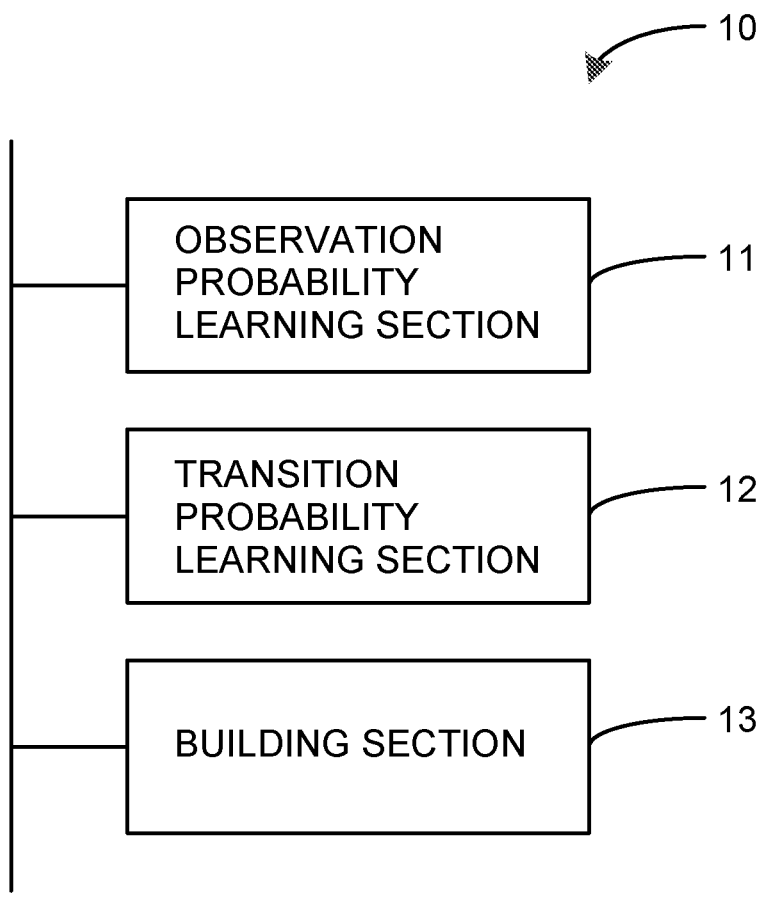
FIG. 2 is a block diagram illustrating an example of a functional configuration of the present exemplary embodiment.

FIG. 2 is an example of a functional block diagram of an action phase segment estimation model building device 10 of the present exemplary embodiment. The action phase segment estimation model building device 10 includes an observation probability learning section 11, a transition probability learning section 12, and a building section 13. The observation probability learning section 11, as described below, uses unsupervised data to learn observation probabilities of an HSMM, which is an example of an action phase segment estimation model.

A target of the present exemplary embodiment is an action limited to achieving a given task goal. Such an action is, for example, an action in a standard task performed on a production line of a factory, and has the following properties.

Property 1: a difference between each action configuring a task is a difference in a combination of limited plural movements.

Property 2: plural postures observed when the same task is performed are similar to each other.

In the present exemplary embodiment, based on property 1, all actions are configured by movements contained in a single movement set. As illustrated in the example in FIG. 3, a movement set includes, for example, three movements m11, m12, m13.

For example, the movement m11 may be "raise arm", the movement m12 may be "lower arm", and the movement m13 may be "extend arm forward". The number of movements contained in the movement set is not limited to the example illustrated in FIG. 3. The number of movements contained in each action is also not limited to the examples illustrated in FIG. 3.

Figure 3:
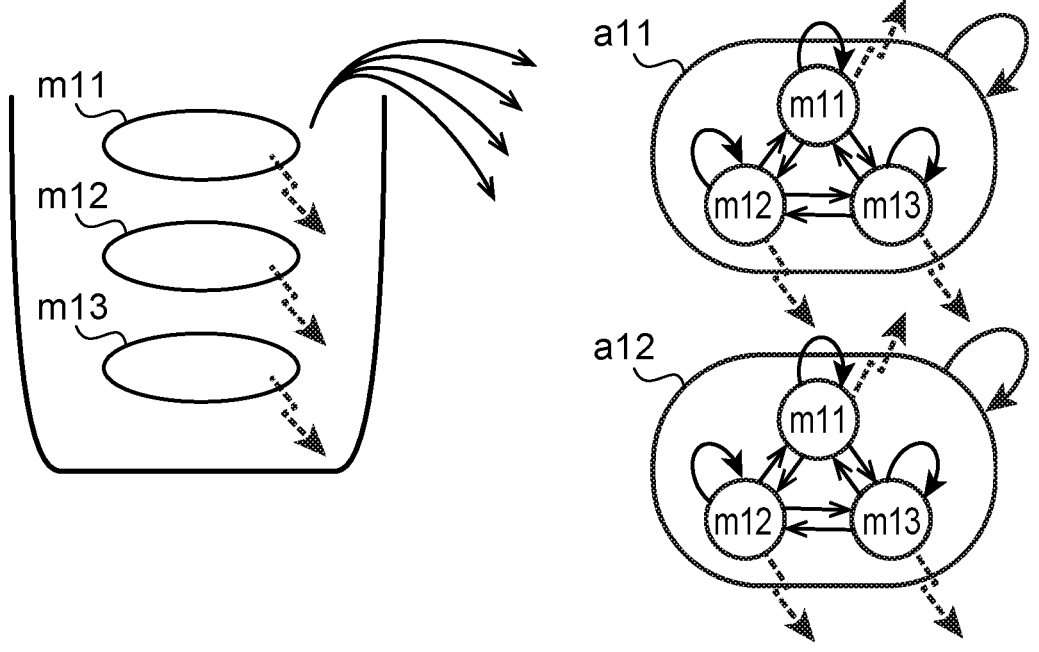
FIG. 3 is a schematic diagram illustrating an example of states of a first hidden Markov model of the present exemplary embodiment.

In the HMM of FIG. 3, action phase segments can be learned using unsupervised data because observation probabilities of each movement corresponding to the broken line arrows are not dependent on the action phase. Learning is performed, for example, using machine learning, a neural network, deep learning, or the like.

More specifically, a model employed for unsupervised learning of observation probabilities may be a Gaussian mixture model (GMM). For each observation, a single movement is selected probabilistically from out of the movements, and a Gaussian distribution is generated for this movement. This is a different assumption to supervised learning not using a time series dependency relationship of observation. The parameters of each Gaussian distribution of the trained GMM are assigned to Gaussian distributions that are probability distributions of the observation probabilities for each movement.

As described below, the transition probability learning section 12 learns the transition probabilities of the movements of the first HMMs using learning data appended with teacher information (hereafter referred to as supervised data). The teacher information is information giving a correct answer of a time segment in which each action phase occurs for posture time series data. The training is, for example, performed using maximum likelihood estimation and an expectation maximization algorithm (EM algorithm) or the like (another approach may also be employed therefor, such as machine learning, a neural network, deep learning, or the like).

Generating supervised data takes both time and effort. Thus in the present exemplary embodiment the learnt observation probabilities are fixed in the observation probability learning section 11, and transition probabilities are learned from the existing supervised data.

Figure 4:
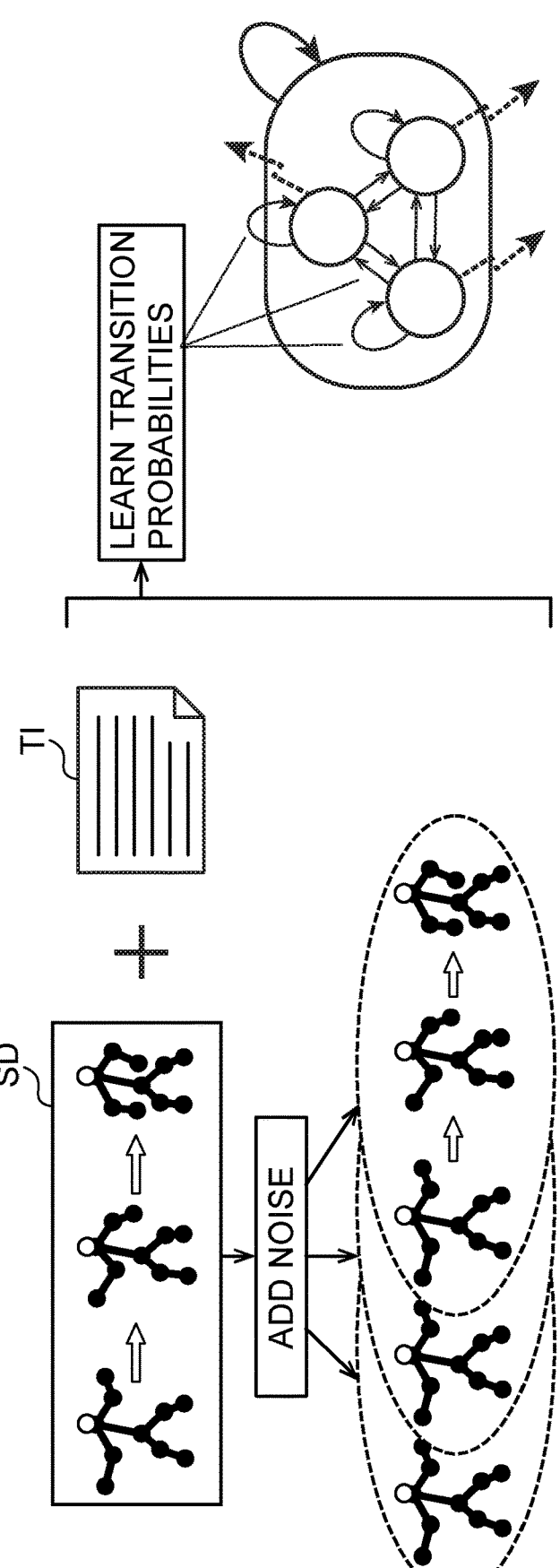
FIG. 4 is a schematic diagram to explain augmentation of supervised data.
Figure 5:
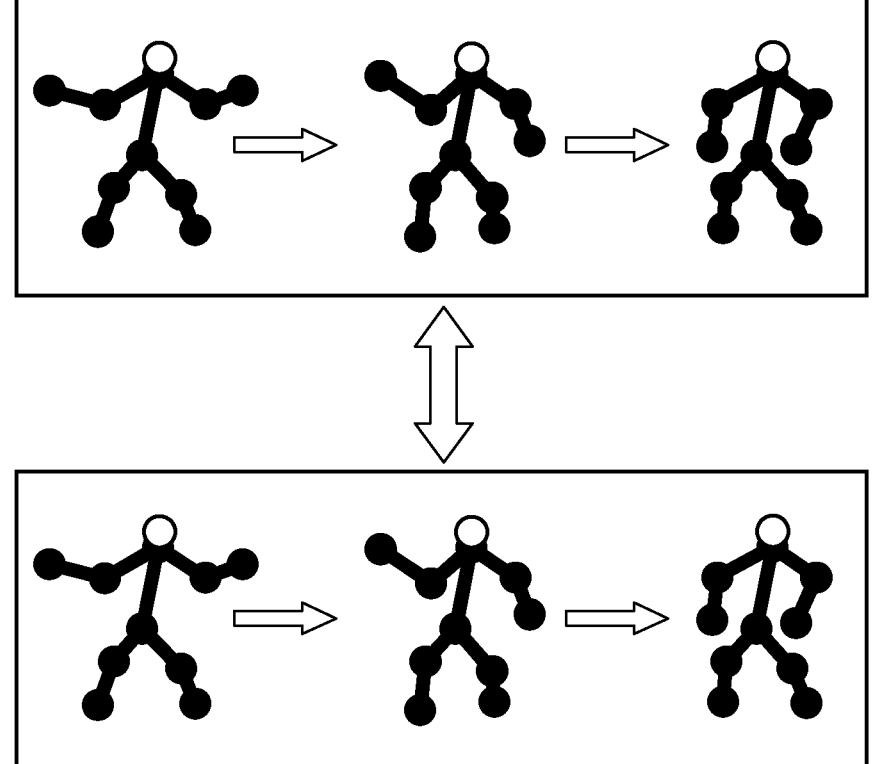
FIG. 5 is a schematic diagram to explain augmentation of supervised data.

More specifically, as illustrated in the example of FIG. 4, data of existing supervised data, which is an example of first supervised data, is used as seed data SD, noise is added to the seed data SD, and the data is augmented by oversampling therefrom. From above property 2 it follows that postures for the same task are similar to each other, and so by adding noise, data can be generated that has a similar variation to the variation of each actual observation such as in the example illustrated in FIG. 5. The noise may, for example, be random noise.

The supervised data is augmented by applying teacher information TI of the seed data SD commonly across respective items of the augmented data. The augmented supervised data, which is an example of second supervised data, is employed to learn the transition probabilities of plural movements of the first HMIs using supervised learning.

In oversampling, noise of a prescribed range is generated and added to observation samples at each clock-time. When generating noise, movements having a high probability of having generated the observation sample are identified, and noise added thereto is generated with an appropriate magnitude in consideration of a relationship between spreads in feature space of the sample set of this movement and of a sample set of another movement. This thereby enables more appropriate supervised data to be generated.

For example, noise added may be generated from a multivariate Gaussian distribution having a covariance that is a fixed multiple of the covariance of the sample set of the identified movement. Moreover, a center distance d may be computed from the sample set of the identified movement to the sample set of the movement having a nearest center distance thereto, and the noise added may be generated from an isotropic Gaussian distribution (i.e. with a covariance matrix that is a diagonal matrix) such that a standard deviation in each axis direction of feature space is a fixed multiple of d.

There are differences in the scattering of samples included in the sample set of each movement, namely in the spread in feature space. Namely, scattering in some movements is extremely small, and in some movements is extremely large. Were random noise of a fixed range to be employed for all the movements, then the way in which variation is induced by the random noise would be relatively small when a sample set of a given movement includes samples having a large scattering. However, the way in which variation is induced by the random noise would be relatively large when a sample set of a given movement includes samples having a small scattering.

Figure 6:
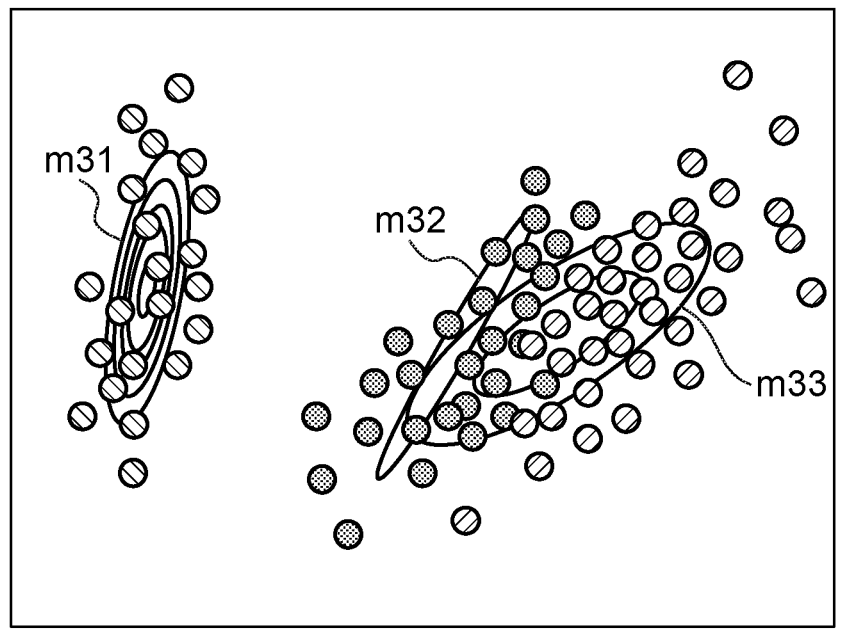
FIG. 6 is a schematic diagram to explain augmentation of supervised data.
Figure 7:
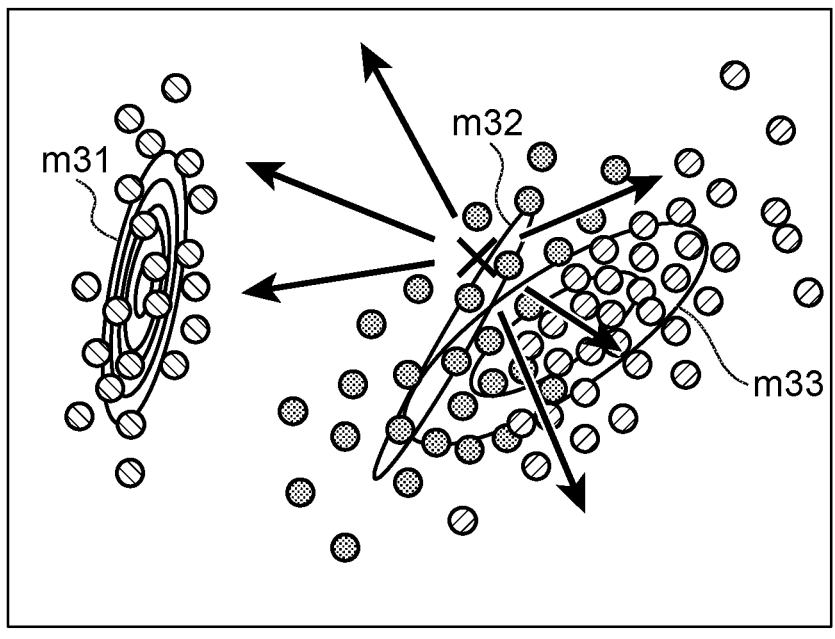
FIG. 7 is a schematic diagram to explain augmentation of supervised data.

FIG. 6 illustrates an example of sample sets of a movement m31, a movement m32, and a movement m33. FIG. 7 illustrates an example of a state in which random noise has been added to the sample set of the movement m32. In FIG. 7, the random noise has a large range, and so there are many samples at a distance from the original movement m32. In such cases too, adding noise of an appropriate magnitude in consideration of a relationship of a manner of spread in feature space between the sample set of a given movement and the sample set of another movement, as described above, enables more appropriate supervised data augmentation.

The building section 13 uses the observation probabilities learnt in the observation probability learning section 11 and the state transition probabilities learnt in the transition probability learning section 12 to build an HSMM such as in the example illustrated in FIG. 1. O1, O2, . . . , O8 represent the observation probabilities learnt in the observation probability learning section 11, and the arrows between the movements m1, m2, and m3 contained in each of the action phases a1, a2, a3 correspond to the state transition probabilities learnt in the transition probability learning section 12. d1, d2, d3 represent successive durations of the respective action phases, and the probability distributions of the successive durations are determined from the successive durations of the action phases of the teacher information. For example, the probability distributions of the successive durations may be uniform distributions having a fixed range. Sensor data generated by detecting postures of a person using sensors are applied to the built HSMM, and action phase segments, which are time segments for each action phase, are estimated. More specific details regarding estimation are described later.

The action phase segment estimation model building device 10 of the present exemplary embodiment includes the following characteristics.

1. Observation probabilities of common movements for all actions of the first HMMs are learned by unsupervised learning.

2. Transition probabilities between movements of the first HMIs are learned by supervised learning using the supervised data resulting from augmenting the supervised seed data.

Figure 8:
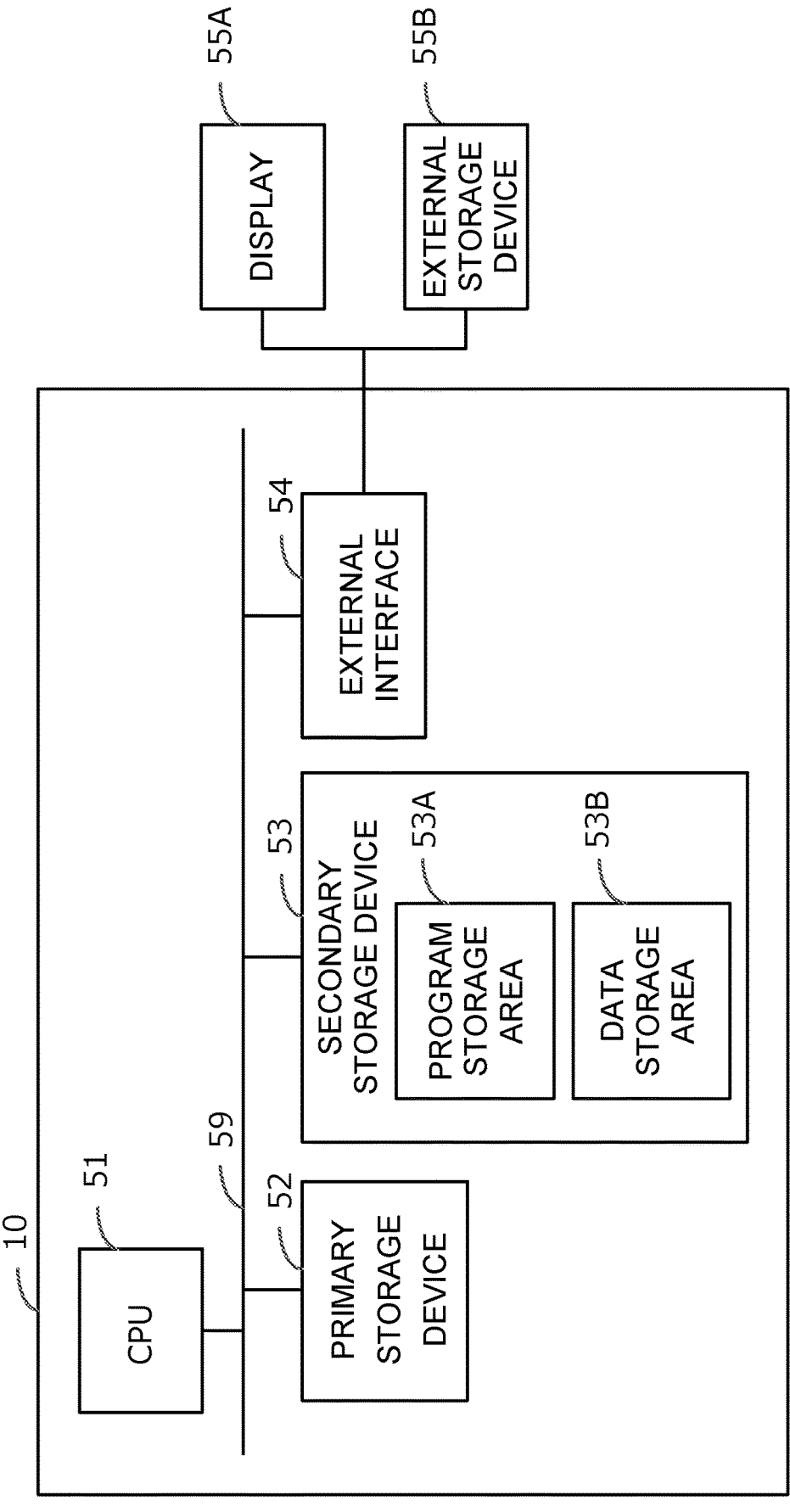
FIG. 8 is a block diagram illustrating an example of a hardware configuration of the present exemplary embodiment.

The action phase segment estimation model building device 10 includes, for example, a central processing unit (CPU) 51, a primary storage device 52, a secondary storage device 53, and an external interface 54, as illustrated in FIG. 8. The CPU 51 is an example of a processor, which is hardware. The CPU 51, the primary storage device 52, the secondary storage device 53, and the external interface 54 are connected together through a bus 59. The CPU 51 may be configured by a single processor, or may be configured by plural processors. A graphics processing unit (GPU) may also be employed, for example, instead of the CPU 51.

The primary storage device 52 is, for example, volatile memory such as random access memory (RAM) or the like. The secondary storage device 53 is, for example, non-volatile memory such as a hard disk drive (HDD) or a solid state drive (SSD).

The secondary storage device 53 includes a program storage area 53A and a data storage area 53B. The program storage area 53A is, for example, stored with a program such an action phase segment estimation model building program. The data storage area 53B is, for example, stored with supervised data, unsupervised data, learnt observation probabilities, transition probabilities, and the like.

The CPU 51 reads the action phase segment estimation model building program from the program storage area 53A and expands the action phase segment estimation model building program in the primary storage device 52. The CPU 51 acts as the observation probability learning section 11, the transition probability learning section 12, and the building section 13 illustrated in FIG. 2 by loading and executing the action phase segment estimation model building program.

Note that the program such as the action phase segment estimation model building program may be stored on an external server, and expanded in the primary storage device 52 over a network. Moreover, the program such as the action phase segment estimation model building program may be stored on a non-transitory recording medium such as a digital versatile disc (DVD), and expanded in the primary storage device 52 through a recording medium reading device.

An external device is connected to the external interface 54, and the external interface 54 performs a role in exchanging various information between the external device and the CPU 51. FIG. 8 illustrates an example in which a display 55A and an external storage device 55B are connected to the external interface 54. The external storage device 55B is, for example, stored with supervised data, unsupervised data, the built HSMM, and the like. The display 55A displays, for example, so as to enable viewing of the built HSMM model.

The action phase segment estimation model building device 10 is, for example, a personal computer, a server, a computer in the cloud, or the like.

Figure 9:
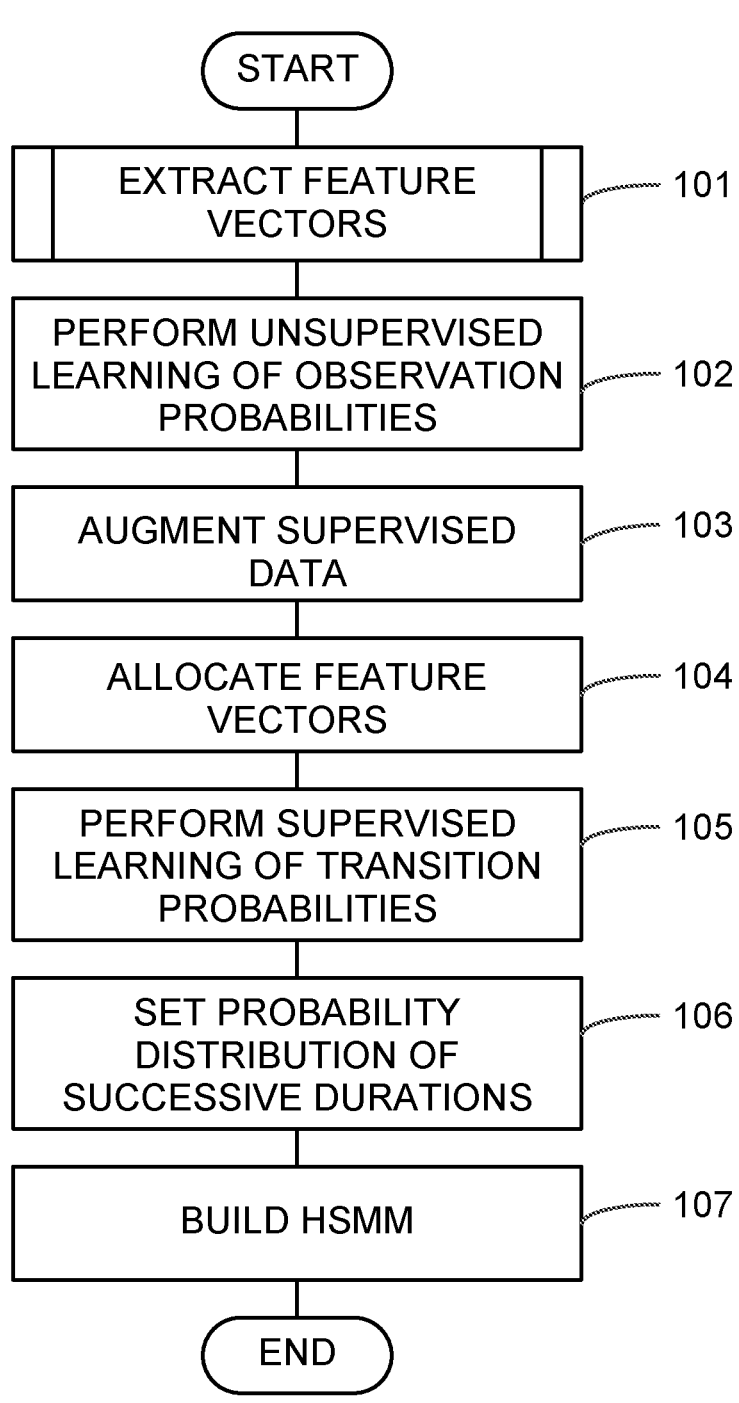
FIG. 9 is a flowchart illustrating an example of a flow of an action phase segment estimation model building processing.

FIG. 9 illustrates an example of a flow of action phase segment estimation model building processing. At step 101, the CPU 51 extracts feature vectors expressing a motion that is a series of postures of a person from learning data, as described below. At step 102, the CPU 51 performs clustering (GMM parameter estimation) on the feature vectors extracted at step 101 so as to classify into elemental movements, and learns the observation probabilities of each movement using unsupervised learning.

At step 103, the CPU 51 adds noise to the supervised seed data, and augments the supervised data by appending the teacher information of the supervised seed data to the data generated by oversampling. At step 104, the CPU 51 allocates the feature vectors for the supervised data to respective time segments of the actions appended with the teacher information.

At step 105, the CPU 51 takes a time series of the feature vectors in the time segments allocated at step 104 as observation data, and uses the supervised data augmented at step 103 to learn the transition probabilities of the movements of the first HMMs using supervised learning.

At step 106, the CPU 51 sets, as a probability distribution of successive durations of respective action phases, a uniform distribution having a prescribed range for the successive durations of the respective action phases appended with the teacher information. The CPU 51 uses the observation probabilities learnt at step 102 and the transition probabilities learnt at step 105 to build an HSMM. The HSMM is built such that actions of the second HMIs transition in the order of the respective action phases appended with the teacher information after a fixed period of time set at step 106 has elapsed. The built HSMM may, for example, be stored in the data storage area 53B.

Figure 10:
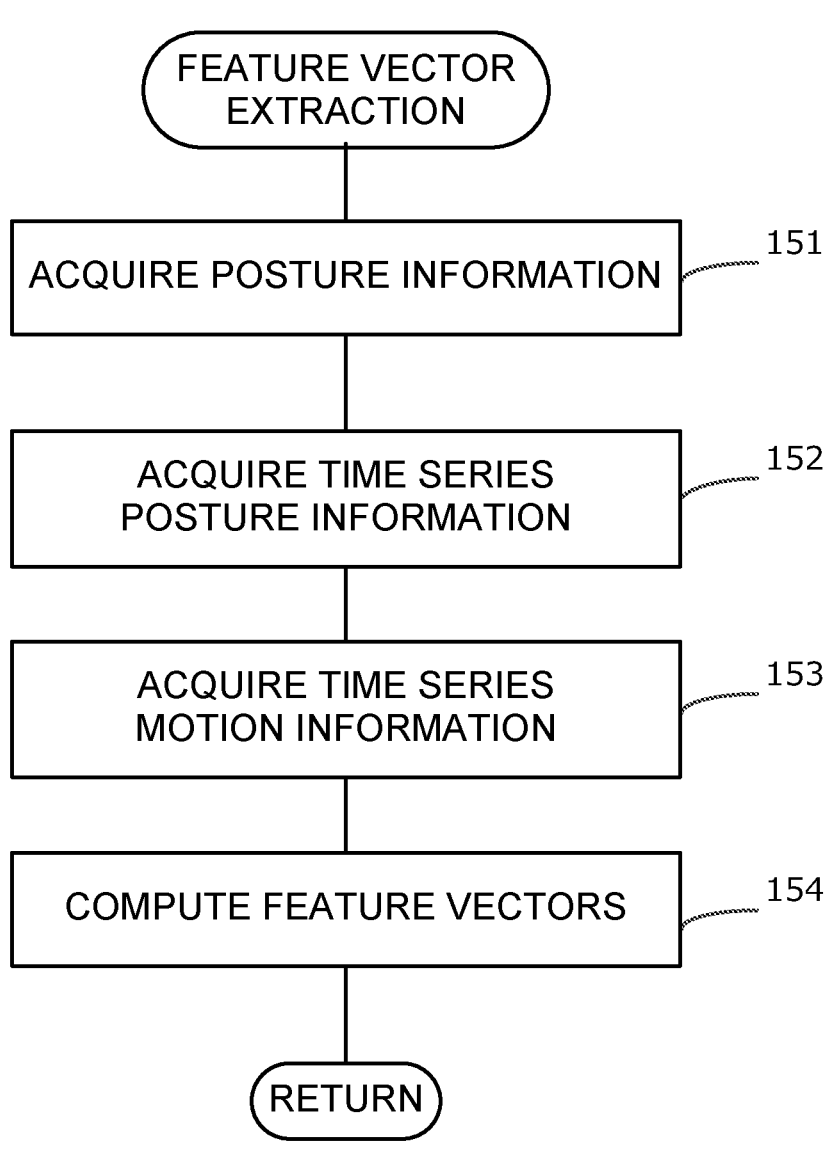
FIG. 10 is a flowchart illustrating an example of a flow of feature vector extraction processing.

FIG. 10 illustrates an example of detail of the feature vector extraction processing of step 101 of FIG. 9. At step 151, the CPU 51 acquires posture information of a person by observing and tracking a person in data employed for training. In cases in which the posture information acquired at step 151 contains posture information for plural people, at step 152 the CPU 51 acquires, from the time series data of posture information, time series data of posture information that is the target for analysis. The analysis target posture information is selected from a size of a bounding box around the person, time, or the like.

At step 153, the CPU 51 acquires time series data of motion information for each location on a body from the time series data of the posture information acquired at step 152. The time series data of the motion information may, for example, be curvature, curvature speed, and the like for each location. The locations may, for example, be an elbow, a knee, or the like.

At step 154, the CPU 51 uses a sliding time window to compute feature vectors by averaging the motion information of step 153 in the time direction within a window for each fixed time interval.

Figure 11:
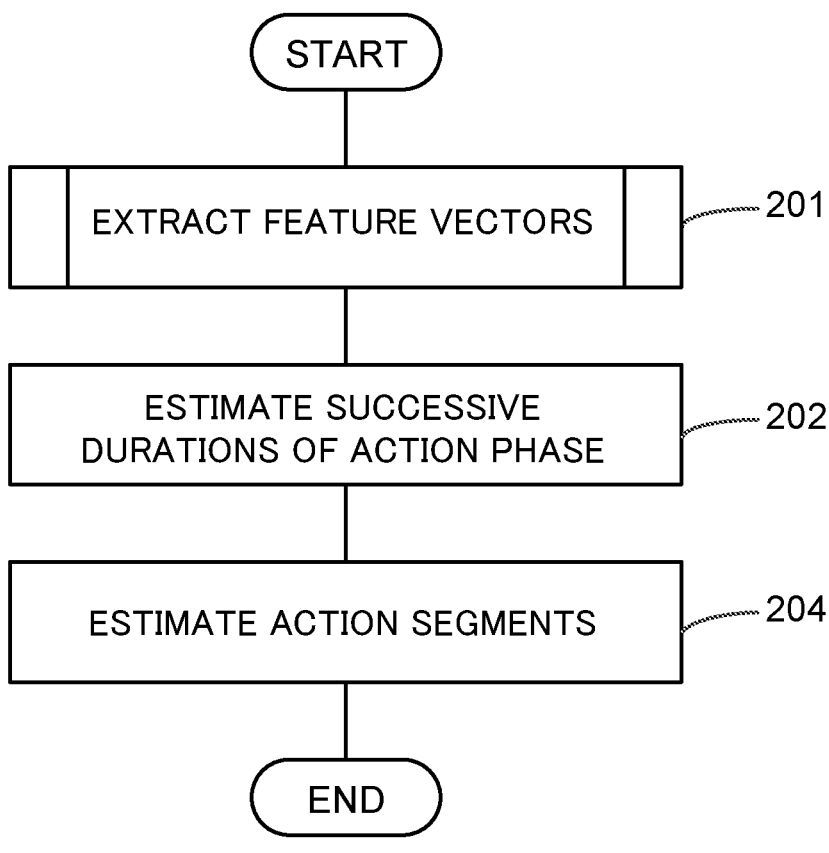
FIG. 11 is a flowchart illustrating an example of a flow of action segment estimation processing.

FIG. 11 illustrates an example of a flow of action segment estimation processing employing the HSMM built in the present exemplary embodiment. The action segment estimation model building device 10 of FIG. 8 may function as the action phase segment estimation device by storing the built HSMM in the data storage area 53B.

At step 201, the CPU 51 extracts feature vectors from sensor data generated by detecting postures of a person using sensors. The sensors are devices to detect person posture and may, for example, be a camera, infrared sensor, motion capture device, or the like. Step 201 of FIG. 11 is similar to step 101 of FIG. 9, and so detailed explanation thereof will be omitted.

At step 202, the CPU 51 takes a time series of the feature vectors extracted at step 201 as observation data, and estimates successive durations of the action phases by comparison against the HSMM built using the action phase segment estimation model building processing. At step 204, the CPU 51 computes successive durations for the respective actions by adding the successive durations for the action phases contained in each action, and estimates time segments for each action from the successive durations of each action state.

For example, in technology employing a video as input so as to recognize a particular action in the video, basic movement recognition, element action recognition, and higher level action recognition are performed. A particular action in a video is a more complicated higher level action from combining element actions, basic movement recognition is posture recognition for each frame, and element action recognition is performed by temporal spatial recognition, and recognizes a simple action over a given length of time. Higher level action recognition is recognition of a complex action over a given length of time. Such technology utilizes action segment estimation model building processing and a built action segment estimation model to enable estimation of action segments.

Figure 12:
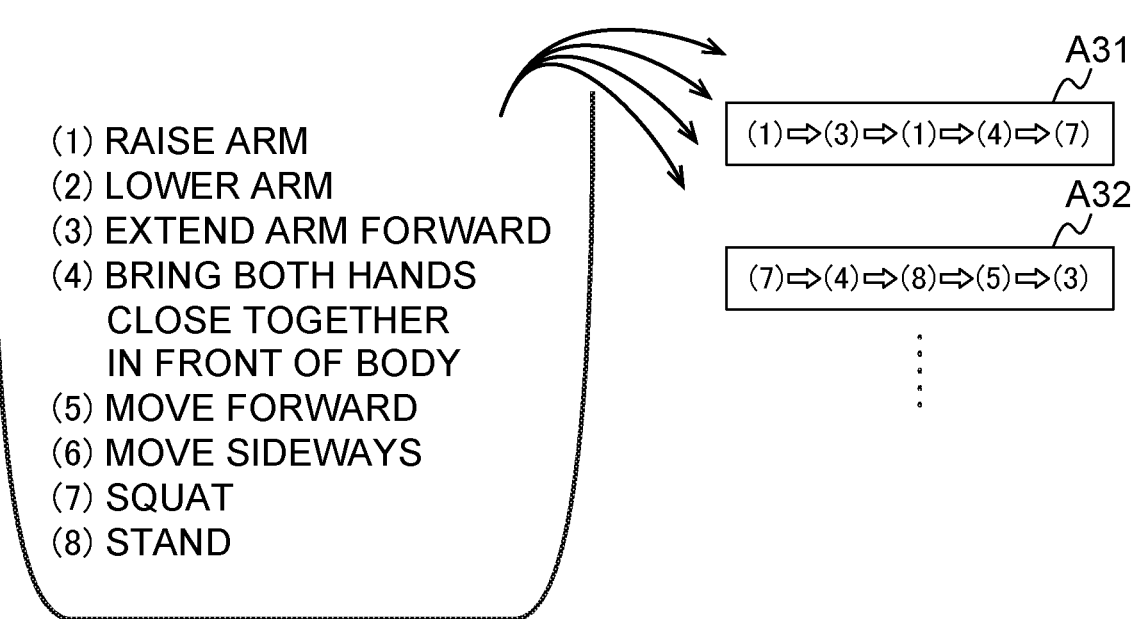
FIG. 12 is a schematic diagram to explain actions of related technology.

An HSMM in which movements included in actions are not particularly limited may be employed in related technology. In such related technology, for example as illustrated in the example in FIG. 12, suppose that the following movements are present.

(1) raise arm, (2) lower arm, (3) extend arm forward, (4) bring both hands close together in front of body, (5) move forward, (6) move sideways, (7) squat, (8) stand.

Examples of actions are, for example, as set out below:
Action A31: (1) raise arm→(3) extend arm forward→(1) raise arm→(4) bring both hands close together in front of body→(7) squat;
Action A32: (7) squat→(4) bring both hands close together in front of body→(8) stand→(5) move forward→(3) extend arm forward; and the like.

Figure 13:
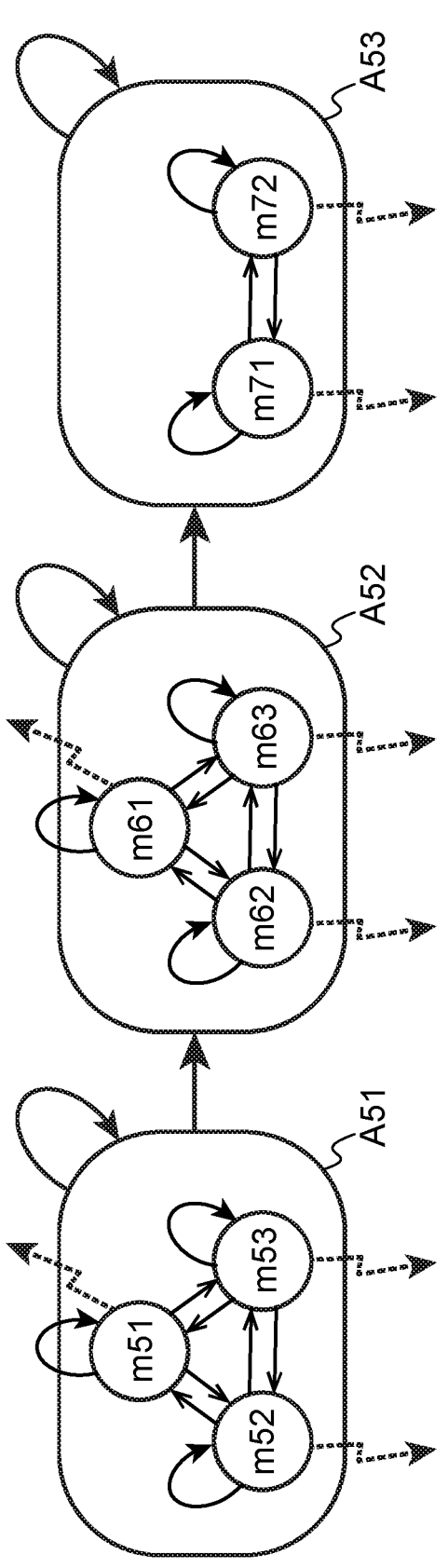
FIG. 13 is a schematic diagram illustrating an example of a hierarchical hidden Markov model of related technology.

As described above, in cases in which an HMM includes movements of general actions, namely plural movements not limited for the action to be estimated, the observation probabilities of the movements are difficult to express as a single simple probability distribution. In order to address this issue there is technology that employs a hierarchical hidden Markov model. As illustrated in the example in FIG. 13, a hierarchical hidden Markov model includes a higher level HMM containing plural lower level HMMs as states. Actions A51, A52, and A53 are examples of lower level HMMs. Each of the lower level HMMs includes movements as states, and examples of movements are m51, m52, m53, m61, m62, m62, m63, m71, and m72.

Figure 14:
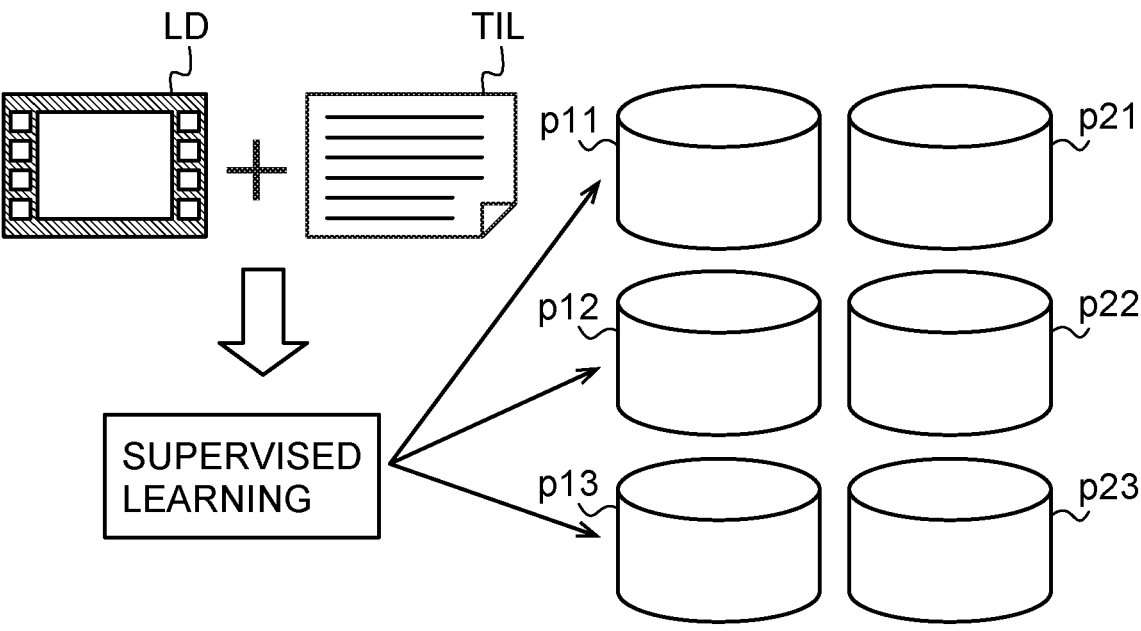
FIG. 14 is a schematic diagram illustrating an example of an overview of related technology.

As illustrated in the example in FIG. 14, a hierarchical HMM uses learning data LD appended with teacher information TIL, and learns observation probabilities and transition probabilities of movements for each action by supervised learning. FIG. 14 illustrates an example of the observation probability p11 and the transition probability p21 of an action A51, the observation probability p12 and the transition probability p22 of an action A52, and the observation probability p13 and the transition probability p23 of an action A53. However, in a hierarchical HMM there is a great number of parameters and the degrees of freedom for the parameters are high, and so a great volume of supervised data is employed to learn the parameters. This means that time and effort is needed to create teacher information for the supervised data.

Figure 15:
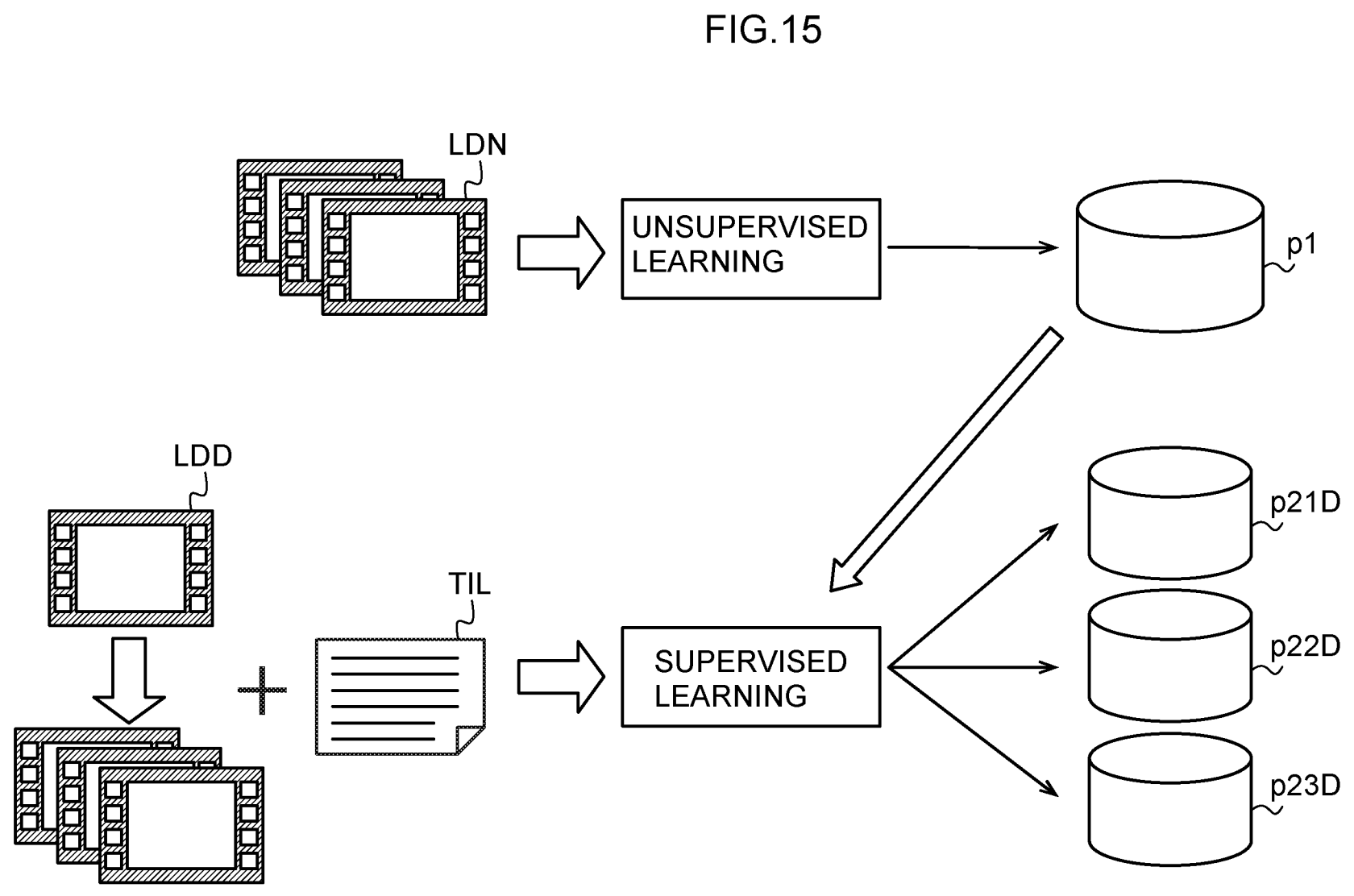

However, in the present disclosure, as illustrated in FIG. 15, the common observation probabilities p1 of the respective first HMMs corresponding to actions of the HSMM are learned by unsupervised learning using the unsupervised data LDN. The learned observation probabilities p1 are fixed, and the transition probabilities p21D, p22D, p23D of the respective movements of the first HMMs are learned by supervised learning employing the supervised data. In the present disclosure, the supervised data is augmented, by adding the teacher information TIL of the supervised data LDD to data generated by adding noise to the existing supervised data LDD and oversampling, and this augmented supervised data is employed in supervised learning. Thus in the present exemplary embodiment an action phase segment estimation model can be built efficiently even in cases in which there is only a small volume of existing supervised data.

Figure 16:
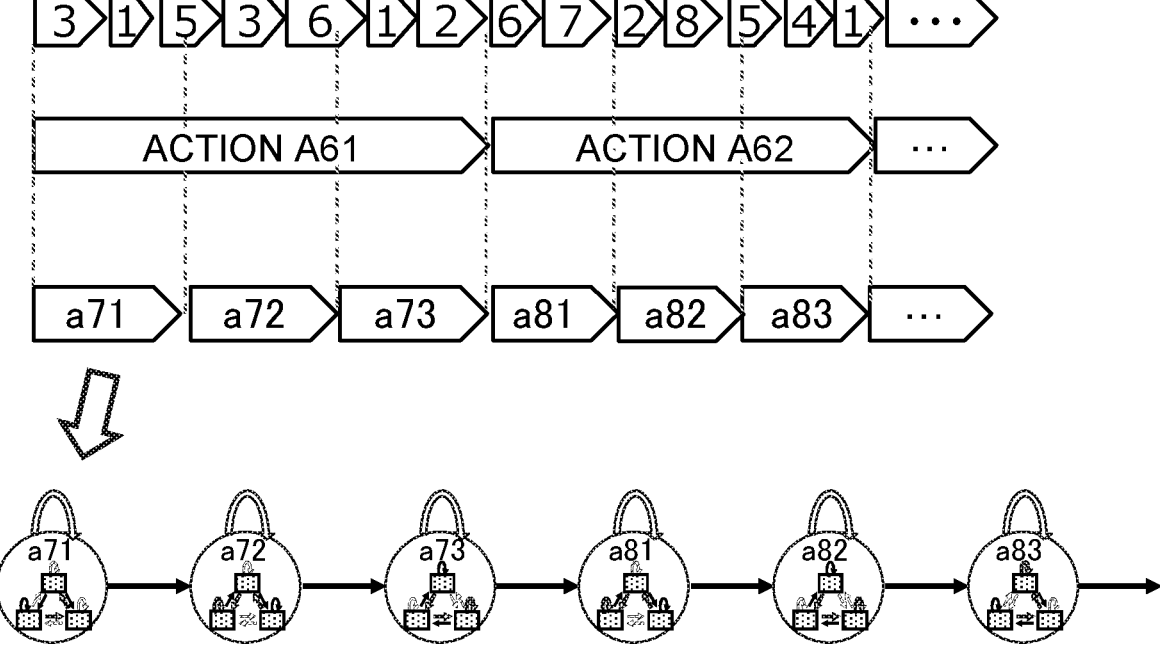
FIG. 16 is a schematic diagram to explain an example of a hidden semi-Markov model of the present exemplary embodiment.

As illustrated in the example of FIG. 16, in the present disclosure the second HMMs correspond to respective action phases. In the example of FIG. 16, an action A61 including movements 3, 1, 5, 3, 6, 1, 2 is evenly divided temporally across action phases a71, a72, a73, and action A62 including movements 6, 7, 2, 8, 5, 4, 1 is evenly divided temporally across action phases a81, a82, a83. The HSMM at the bottom of FIG. 16 contains the second HMMs corresponding to the action phases a71, a72, a73, a81, a82, a83. In cases in which leftover time arises from dividing the actions, action phases may be generated by dividing actions substantially evenly.

Figure 17:
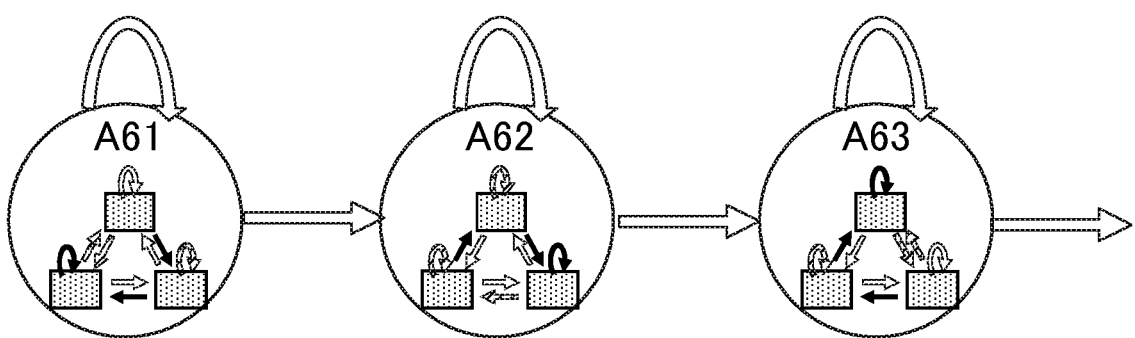
FIG. 17 is a schematic diagram illustrating an example of a hidden semi-Markov model of related technology.
Figure 18:
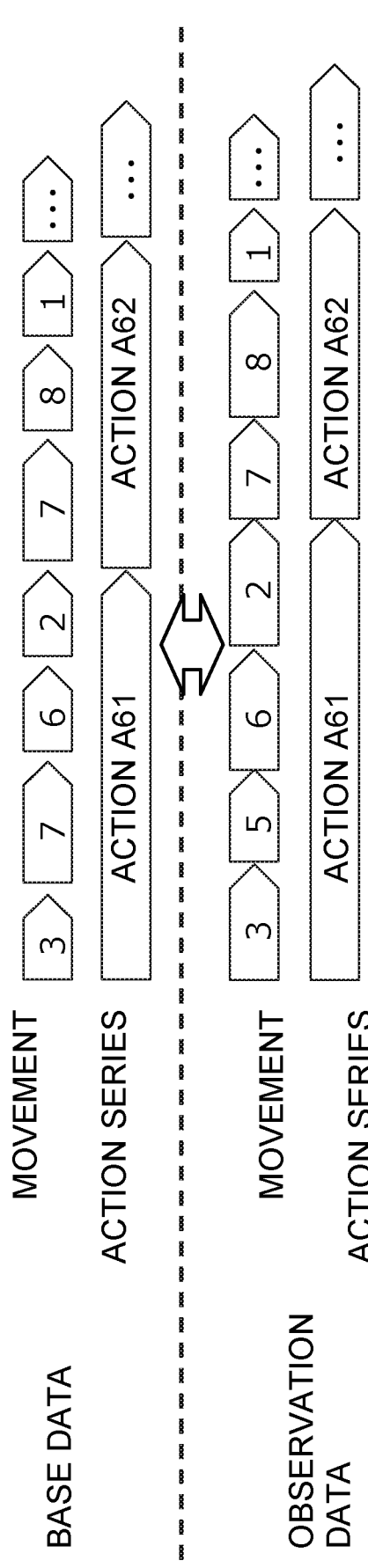
FIG. 18 is a schematic diagram illustrating an example of fluctuation in movements contained in actions.

Consider a case in which each of the second HMMs corresponds to an action, as illustrated in FIG. 17. As illustrated in FIG. 18, actions are modeled by an order of movements included in base data. However, even for the same action there are fluctuations in the movements and the order of movements during actual implementation of a task, and they are not completely the same. For example, as illustrated in FIG. 18, movements contained in the action A61 of base data are an order of movements 3, 7, 6, 2, and observation data thereof is an order of movements 3, 5, 6, 2.

As illustrated in FIG. 17, modeling the order of movements for each action by the transition probabilities between movements from the base data enables an action series to be estimated with a high overall probability, even in cases in which there is some fluctuation in the appearance order of movements in the observation data. However, when modeling using the transition probabilities between movements, sometimes a high evaluation is indicated even for cases in which order restrictions are weak and the order differs greatly.

More specifically, due to modeling being performed within a single action using transition probabilities between common movements, modeling is not able to be performed such that there is a high probability of a movement 2 following movement 1 at a point near to the start of an action and a high probability of a movement 3 following movement 1 at a point near to the end of the action. Namely, a relationship learned is not an appearance order of movements, but is instead a transition relationship of movements, namely that a second movement is liable to appear following a first movement. Thus cases sometimes arise in which a movement that should be determined as being included in a second action and not in a first action, is actually determined as being included in the first action.

Figure 19:
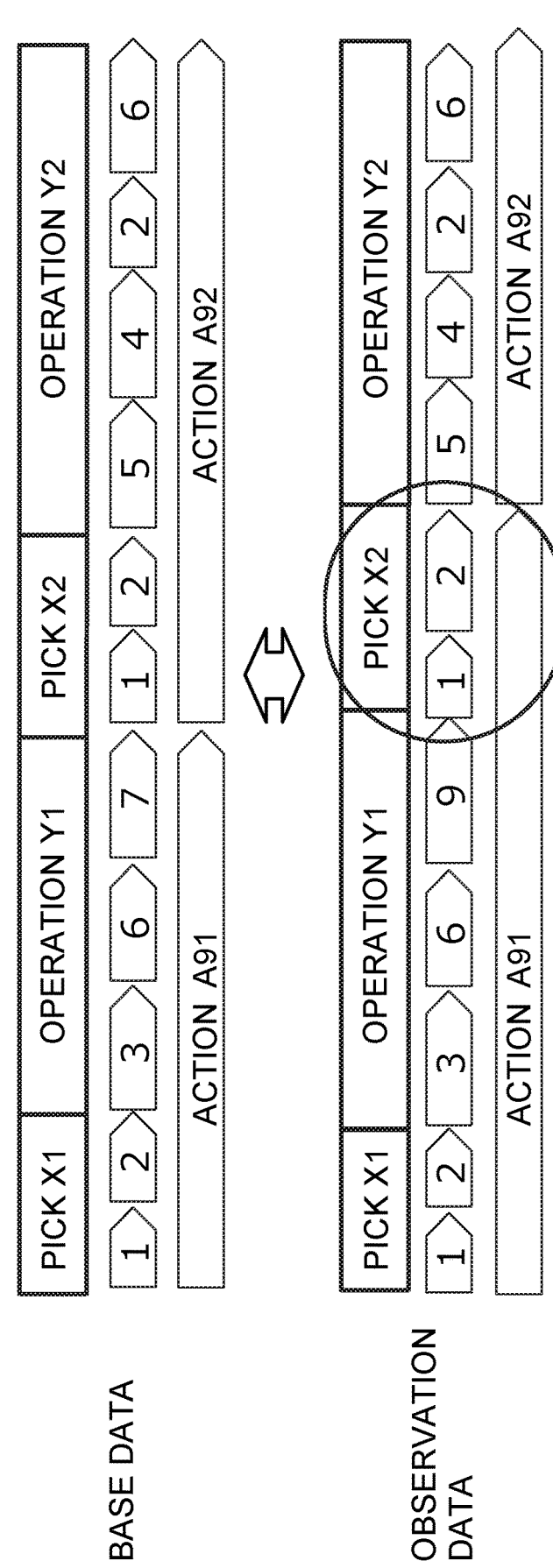
FIG. 19 is a schematic diagram illustrating an example of mistaken estimation of action segments.

For example, as illustrated in the example of FIG. 19, mistaken estimation is liable to occur in a case in which an action A91 is an action of "perform picking operation Y1 of part X1", and an action A92 is an action of "perform picking operation Y2 of part X2". As illustrated in the example of FIG. 19, "picking part X1" and "picking part X2" both include the movements 1, 2 that arise in the same order, and so movements 1, 2 included in a start section of action A92 are hitherto mistakenly estimated as being included in an end section of action A91.

In the present disclosure, the transition probabilities of movements are modeled for action phases generated by dividing each action. The plural movements contained in each action are, for example, predetermined by user definition or the like, and a number of movements included in each action is unable to be controlled. However, in the present disclosure, the number of movements is controlled by dividing each of the actions to generate action phases, and modeling is performed using the action phases that appear in a decided order and not by probability.

This thereby enables order related restrictions to be strengthened due to the transition probabilities of movements for each of the action phases being handled separately from each other within a single action. Moreover, order restrictions can be further strengthened by increasing the number of divisions of an action and by reducing the number of movements included in the action phases. Namely, observation data not in a similar order to the base data will not be given a high evaluation. This thereby enables a strength of order restrictions to be adjusted by deciding on the number of divisions of an action experimentally.

For example, the number of movements in an action, namely the number of divisions based on the number of transitions of movements, may be decided. The likelihood of the same movement appearing differs in a temporally short action and long action, and in cases in which the number of divisions is made the same, a difference arises in the strength of restriction with respect to ordering, and so deciding on the number of divisions of actions experimentally takes effort. However, this effort can be avoided by deciding the number of divisions based on the number of movements in an action.

If the number of transitions of movements in an action phase is too many, then similar movements are liable to appear in a given action phase and in an adjacent action phase. However, if the number of transitions of movements in an action phase is too few, then the advantageous effect from modeling order with probabilistic transitions is diminished. Namely, the advantageous effect for evaluation of an order of plausible movement transitions is diminished even in cases in which there is no complete match between the base data and the appearance order of movements. Thus the number of divisions is decided so as to achieve an even number of transitions of movements included in the action phases. The action phases may be generated by dividing actions substantially evenly in cases in which a leftover movement arises from dividing the actions. For example, in cases in which the number of movements included in an action is 15, then a number of movements contained in the action phases may be set as 5, 5, 5, and in cases in which the number of movements included in an action is 16, then the number of movements contained in the action phases may be set as 5, 5, 6.

In the present exemplary embodiment the hidden semi-Markov model includes plural second hidden Markov models that include plural first hidden Markov models having types of person movement as states. Each of the plural second hidden Markov models has states of partial actions that are parts of actions determined by combining plural movements. In the hidden semi-Markov model, the observation probabilities are learned by unsupervised learning for each the movement types of the plural first hidden Markov models. The learned observation probabilities are fixed, and input first supervised data is augmented to give second supervised data, and the transition probabilities of movements of the first hidden Markov models are learned by supervised learning using the second supervised data. The hidden semi-Markov model, which is a model to estimate segments of partial action, is built using the learned observation probabilities and transition probabilities.

The present disclosure enables a partial action segment estimation model to be built efficiently. Namely, for example, time segments of each action can be estimated accurately under conditions in which an order of appearance is restricted for plural actions of movements performed in a decided order, such as in standard tasks in a factory, in dance, and in martial art forms. Moreover, the present disclosure enables time segments of an action including partial actions to be more appropriately estimated by estimating the time segments of partial actions appropriately.

There is a high cost to generating teacher information of supervised data when training a model to estimate time segments of actions.

One of objects of the present disclosure is to efficiently build a partial action segment estimation model.

One of aspects of the present disclosure enables a partial action segment estimation model to be built efficiently.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

The invention claimed is:

1. A partial action segment estimation model building device, comprising:

a memory; and a processor connected to the memory, the processor being configured to:

in a hidden semi-Markov model (HSMM) including a plurality of second hidden Markov models each containing a plurality of first hidden Markov models using types of movement of a person as states, and the plurality of second hidden Markov models each using partial actions that are parts of actions defined by combining a plurality of the movements as states, learn observation probabilities for each of the movement types of the plurality of first hidden Markov models using unsupervised learning;

fix the learnt observation probabilities, augment input first supervised data so as to give second supervised data, and learn transition probabilities of the movements of the first hidden Markov models by supervised learning in which the second supervised data is employed;

build the hidden semi-Markov model that is a model for estimating segments of the partial actions by using the learnt observation probabilities and the learnt transition probabilities;

extract feature vectors from sensor data generated by detecting postures of a person using sensors;

take a series of the extracted feature vectors as observation data, and estimate successive durations of respective action phases by comparison against the built HSMM;

compute successive durations for the respective actions by adding the successive durations for the action phases contained in each action; and estimate time segments for each action from the successive durations of each action state, and the built HSMM is applied for estimating the time segments of the action that contains partial actions.

2. The partial action segment estimation model building device of claim 1, wherein the partial actions are each generated by dividing the actions so as to contain durations of equal lengths.

3. The partial action segment estimation model building device of claim 1, wherein the partial actions are each generated by dividing the actions so as to contain an equal number of movements.

4. The partial action segment estimation model building device of claim 1, wherein the processor is configured to augment the first supervised data by adding teacher information of the first supervised data to each item of data generated by adding noise to the first supervised data and oversampling the first supervised data.

5. The partial action segment estimation model building device of claim 4, wherein the noise is random noise.

6. The partial action segment estimation model building device of claim 4, wherein a variance of the noise becomes larger as scattering in a sample of the movement becomes larger.

7. A partial action segment estimation model building method comprising:

by a computer, in a hidden semi-Markov model including a plurality of second hidden Markov models each containing a plurality of first hidden Markov models using types of movement of a person as states, and the plurality of second hidden Markov models each using partial actions that are parts of actions defined by combining a plurality of the movements as states, learning observation probabilities for each of the movement types of the plurality of first hidden Markov models using unsupervised learning;

fixing the learnt observation probabilities, augmenting input first supervised data so as to give second supervised data, and learning transition probabilities of the movements of the first hidden Markov models by supervised learning in which the second supervised data is employed;

building the hidden semi-Markov model that is a model for estimating segments of the partial actions by using the learnt observation probabilities and the learnt transition probabilities;

extracting feature vectors from sensor data generated by detecting postures of a person using sensors;

taking a series of the extracted feature vectors as observation data, and estimate successive durations of respective action phases by comparison against the built HSMM;

computing successive durations for the respective actions by adding the successive durations for the action phases contained in each action; and estimating time segments for each action from the successive durations of each action state, and the built HSMM is applied for estimating the time segments of the action that contains partial actions.

8. The partial action segment estimation model building method of claim 7, wherein the partial actions are each generated by dividing the actions so as to contain durations of equal lengths.

9. The partial action segment estimation model building method of claim 7, wherein the partial actions are each generated by dividing the actions so as to contain an equal number of movements.

10. The partial action segment estimation model building method of claim 7, wherein augmentation is performed on the first supervised data by adding teacher information of the first supervised data to each item of data generated by adding noise to the first supervised data and oversampling the first supervised data.

11. The partial action segment estimation model building method of claim 10, wherein the noise is random noise.

12. The partial action segment estimation model building method of claim 10, wherein a variance of the noise becomes larger as scattering in a sample of the movement becomes larger.

13. A non-transitory recording medium storing a program that causes a computer to execute a partial action segment estimation model building processing, the processing comprising:

in a hidden semi-Markov model including a plurality of second hidden Markov models each containing a plurality of first hidden Markov models using types of movement of a person as states, and the plurality of second hidden Markov models each using partial actions that are parts of actions defined by combining a plurality of the movements as states, learning observation probabilities for each of the movement types of the plurality of first hidden Markov models using unsupervised learning;

fixing the learnt observation probabilities, augmenting input first supervised data so as to give second supervised data, and learning transition probabilities of the movements of the first hidden Markov models by supervised learning in which the second supervised data is employed;

building the hidden semi-Markov model that is a model for estimating segments of the partial actions by using the learnt observation probabilities and the learnt transition probabilities;

extracting feature vectors from sensor data generated by detecting postures of a person using sensors;

taking a series of the extracted feature vectors as observation data, and estimate successive durations of respective action phases by comparison against the built HSMM;

computing successive durations for the respective actions by adding the successive durations for the action phases contained in each action; and estimating time segments for each action from the successive durations of each action state, and the built HSMM is applied for estimating the time segments of the action that contains partial actions.

14. The non-transitory recording medium of claim 13, wherein the partial actions are each generated by dividing the actions so as to contain durations of equal lengths.

15. The non-transitory recording medium of claim 13, wherein the partial actions are each generated by dividing the actions so as to contain an equal number of movements.

16. The non-transitory recording medium of claim 13, wherein augmentation is performed on the first supervised data by adding teacher information of the first supervised data to each item of data generated by adding noise to the first supervised data and oversampling the first supervised data.

17. The non-transitory recording medium of claim 16, wherein the noise is random noise.

18. The non-transitory recording medium of claim 16, wherein a variance of the noise becomes a larger as scattering in a sample of the movement becomes larger.

* * * * *